Aug. 21, 1973     R. R. MYERS     3,753,886

SELECTIVE DESTRUCTION OF BACTERIA

Filed Feb. 11, 1971

INVENTOR
ROBERT R. MYERS
BY
Zarley, McKee & Thomte
ATTORNEYS 3,753,886
SELECTIVE DESTRUCTION OF BACTERIA
Robert R. Myers, deceased, by Helen T. Myers, Executor, 904 NE. 2nd St., Boca Raton, Fla. 33432
Continuation-in-part of abandoned application Ser. No. 710,202, Mar. 4, 1968. This application Feb. 11, 1971, Ser. No. 114,670
Int. Cl. C02b *1/82*; C02c *1/00, 1/02*
U.S. Cl. 204—186          1 Claim

ABSTRACT OF THE DISCLOSURE

A method and means for purifying water and water-base liquids whereby a controlled amount of alternating electrical current is passed through the liquid to destroy all forms of plant and animal life therein, thereby purifying the same. A hollow housing is utilized and has an elongated terminal provided therein which is electrically connected to a source of electrical energy. The housing is grounded and is covered with an insulative material. Liquid in the housing will act as a conductor between the terminal and the grounded housing thereby causing electrical current to flow therethrough which causes the liquid to be purified.

---

This is a continuation-in-part application of Ser. No. 710,202 filed Mar. 4, 1968, now abandoned.

It is a principal object of this invention to provide a method and means for purifying water or water-base liquids.

A further object of this invention is to provide a method and means for purifying water-base liquids including means for passing an alternating electrical current through the liquid to purify the same.

A further object of this invention is to provide a means for purifying water-base liquids by means of an alternating electrical current and including an insulated housing within which the liquid is contained.

A further object of this invention is to provide a means for purifying water-base liquids which meets all necessary safety requirements.

A further object of this invention is to provide a method and means for purifying water-base liquids which economically destroys all forms of animal and plant life therein.

A further object of this invention is to provide a method and means for purifying water-base liquids wherein the liquid is subjected to an alternating electrical current.

A further object of this invention is to provide a method and means for purifying water-base liquids such as water, milk, sewage, etc. wherein the bacteria or the like is destroyed by means of an alternating electrical current.

A further object of this invention is to provide a method and means for purifying water-base liquids which is economical and durable.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
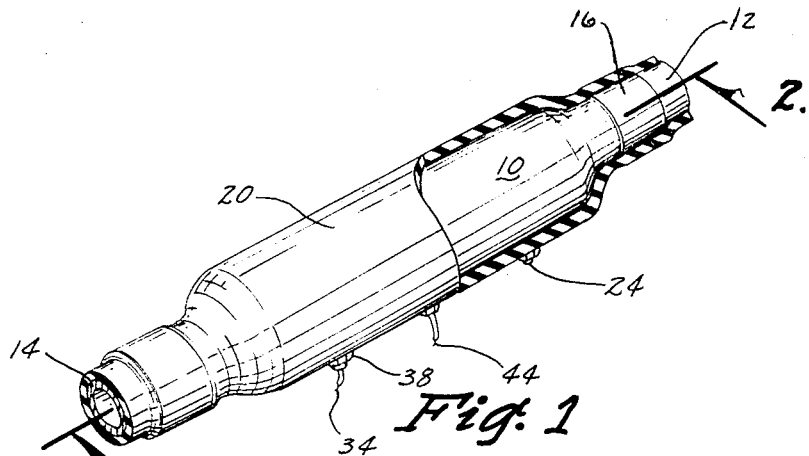
FIG. 1 is a fragmentary perspective view of the means for purifying the liquid with portions thereof cut away to more fully illustrate the invention.

The numeral 10 generally designates a hollow metal housing having conduits 12 and 14 threadably connected thereto at its opposite ends by collars 16. Conduit 14 may be in communication with a source of liquid to be purified if desired and conduit 12 may be in communication with a suitable receptacle for the purified liquid. The liquid 18 may be pumped through the housing 10 if desired which would necessarily depend upon the particular environment in which the apparatus is to be used.

Figure 2:
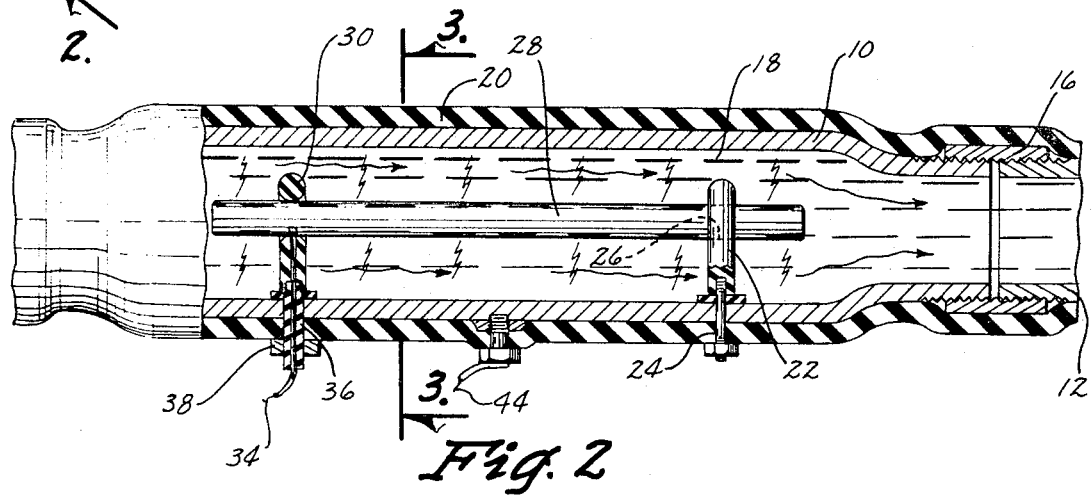
FIG. 2 is an enlarged sectional view as seen along lines 2—2 of FIG. 1 with portions thereof cut away to more fully illustrate the invention.

Conduits 12 and 14, collars 16 and housing 10 are covered with an insulative layer 20 comprised of suitable material such as plastic, rubber, etc. An insulative support post 22 is mounted in housing 10 and is prevented from movement by a screw or bolt means 24 secured thereto and extending outwardly through housing 10 and layer 20 as seen in FIG. 2. Post 22 includes a central opening 26 which receives one end of a round rod 28 which is comprised of a suitable conductive material such as copper.

Figure 3:
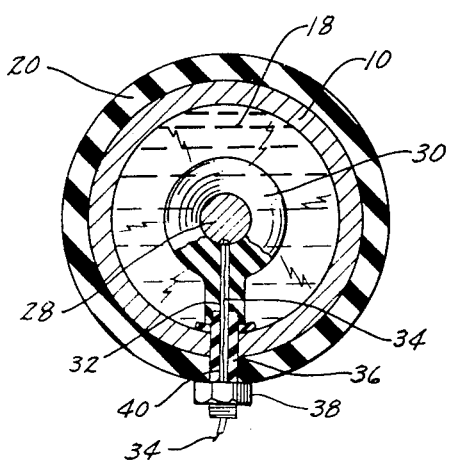
FIG. 3 is an enlarged sectional view as seen along lines 3—3 of FIG. 2 with portions thereof broken away to more fully illustrate the invention.

A post 30 comprised of an insulative material embraces the other end of rod 28 as seen in FIG. 3 and has a bore 32 formed therein through which a wire 34 extends. Posts 22 and 30 are constructed of plastic, nylon, rubber or other suitable insulative material.

Wire 34 is electrically connected to rod 28 and extends through bore 32 as previously mentioned. An insulative stud 36 is threadably secured to post 30 and extends outwardly through housing 10 and layer 20 as illustrated in FIGS. 2 and 3. A nut 38 threadably embraces stud 36 outwardly of layer 20 as seen in FIG. 3. Stud 36 is provided with a bore 40 extending therethrough through which wire 34 extends. The outer end of stud 36 is sealed to prevent liquid from passing outwardly of bore 40. Wire 34 is connected to the "hot" side of a source of alternating electrical current. A metal terminal screw 42 is threadably secured to housing 10 (FIG. 2) and extends outwardly through layer 20. Screw 42 is connected to a wire 44 which is electrically connected to the ground side of the source of electrical current.

Thus, when housing 10 contains water or water-base liquid such as sewage, milk, etc., electrical current will pass therethrough between rod 28 and the grounded housing 10. The central location of rod 28 insures that a uniform electrical field will be present between the rod 28 and the housing 10 to uniformly and efficiently destroy all forms of bacteria, plant and animal life, etc. The amount of electrical current (amperage) supplied to the rod 28 will depend upon the "killing power" desired which will vary with the particular liquid being purified while the voltage will remain substantially constant.

A number of samples of canal water were collected from the Loxahatchee Game Reserve and were subjected to certain experiments and tests caused to be conducted by Robert L. Klein, Jr., of the Division of Research and Invention, of Earle M. Scott & Associates, Inc., of Lancaster, N.Y. The test data from those tests and experiments is found immediately hereinafter.

TEST DATA

| | Flow rate, ml./min. | Residence time [1] | Amps | Voltage applied | Volts/CM | Initial temp., °C. | Final temp., °C. |
|---|---|---|---|---|---|---|---|
| Sample 1.1 | 48 | 10 minutes | | 12 | 5.4 | 29.8 | 38 |
| Sample 2.2 | 190.5 | 2 minutes, 31 seconds | | 24 | 10.8 | 27 | 33.8 |
| Sample 3.3 | 1.31 | 22.08 seconds | 10 | 60 | | 26 | 35 |
| Sample 3.4 | 1.31 | 22.08 seconds | | 120 | | 26 | 60 |
| Sample 4.3 | 1.31 | 22.08 seconds | 10 | 52 | | 32.3 | 33.5 |

[1] Residence time = $\dfrac{\text{Volume of water which the sterilizing instrument can hold}}{\text{flow rate}}$ NOTE.—Volume of water which the sterilizing instrument can hold is 478.5 ml.

Results:

| | | | | | |
|---|---|---|---|---|---|
| Standard, 1.0 | 2.2 | | Standard, 3.0 | 97 | |
| Sample, 1.1 | 2.2 | M.P.N./100 ml.[2] | Sample, 3.3 | −2.2 | |
| Standard | | | Sample, 3.4 | −2.2 | |
| Standard, 2.0 | 240 | | Standard, 4.1 | 23 | |
| Sample 2.2 | 240 | | Sample, 4.2 | −2.2 | |
| | | | Sample, 4.3 | −2.2 | |

[2] M.P.N. = Most probable number of coliform.
Meaning of bacterial count—2.2 = Water which can be used for domestic purposes (washing clothes, dishes, etc.) but not for drinking; −2.2 = Domestic and drinking purposes—ideal sterilization.

In the foregoing experiments, the bacterial count was determined through the use of a microscope having 500× magnification. The flow rate and the amperage (for the purpose of the test) was chosen so that the temperature of the water remained below 36° C. so that no sterilization would occur due to elevated temperatures. From the foregoing it is concluded that a strong electric field and consequently the alternating current produced has a sterilization effect on water. This is evidenced by comparing the test data above. By increasing the current, and at the same time increasing the flow rate to keep the temperature of the water below 36° C., the water can be sterilized to ideal conditions. A current of 10 amps and a flow rate of 1.3 liters/minute (residence time—22.08 seconds) is sufficient for the sterilization of canal water.

A second test apparatus consisted of a section of plastic pipe lined with a metal sleeve which served as one electrode. A second electrode was inserted along the centerline of the first electrode. End closures and connections for water and electrical input were provided.

The outer electrode was 1⅜" I.D. x 23½" long, the inner electrode ⅝" O.D., thus providing a flow face area of 6.45 cm.² and a contact volume of essentially 460 cm.³. Packing with glass fibres reduced said contact volume available for liquid to 320 cm.³; packing with grains of sand to 140 cm.³.

Several control tests were conducted to establish the ability to sterilize and obtain repeatability of the necessary bacteria counts. For the bacteria counts, all samples were placed in Petri dishes on nutrient agar and incubated at essentially 30° C. for 24 hours before counting. Upon application of 60 Hertz power to the system, the following results were obtained:

| Amperes | Volts | Time, min. | Percentage of kill |
|---|---|---|---|
| 2 | 7 | 2 | 5 |
| 4 | 14 | 2 | 7.5 |
| 6 | 21 | 2 | 10 |
| 8 | 28 | 2 | 12.5 |
| 2 | 7 | 4 | 15 |
| 4 | 14 | 4 | 20 |
| 6 | 21 | 4 | 30 |
| 8 | 28 | 4 | 50 |
| 2 | 7 | 8 | 55 |
| 4 | 14 | 8 | 60 |
| 6 | 21 | 8 | 95 |
| 8 | 28 | 8 | 100 |

The above tests were conducted under static flow conditions. It was determined that the effect of contact time is exponential and that amperes are only a weak function of the percent kill. These functions were also found to be valid under flow conditions. Further tests indicated that 60 Hertz is as efficient as about 2,500 Hertz insofar as the percentage of kill was concerned.

It appears that the killing phenomenon at lower frequencies, i.e., 2 to 200 c.p.s. is different from the killing phenomenon at higher frequencies. It is believed that the killing phenomenon at lower frequencies, that is up to 500 c.p.s. it is known that depolarization of cell boundary time the polarity is reversed, or electrical stimulus pulsed, the muscles or muscle structures of the bacteria must react and that, depending on such frequency, they eventually die of exhaustion. This is believed to be why the time variable is exponential.

As the frequency increases, the muscles are not as susceptible to the higher frequeucies, and at least at about 500 c.p.s. it is known that depolarization of cell boundary layers begins and that the bacteria are killed by depolarization.

Selective killing of bacteria appears to exist only between 2 and 300 c.p.s. At approximately 60 c.p.s., the killing phenomenon applies only to selective bacteria. The more developed forms of bacteria, which seem to be the undesirable ones, are apparently killed preferentially while the less developed forms of bacteria (perhaps with less developed muscles) which are beneficial and should not be killed, are not killed as readily.

Direct current applied to most metal electrodes will produce the metal hydroxide at the anode and it is known that the metal hydroxide has an effect on bacteria. However, with alternating current, no metal hydroxide is produced at least at 60 c.p.s. or higher. The movement of bacteria in a DC field is an automatic or directed response to stimulus (topotaxis) as opposed to a undirected avoidance response to undersirable stimuli (photobotaxis). Moreover, bacteria move by manipulation of hairlike appendages (cilia) which are controlled and coordinated by their neuromotor apparatus. It was observed miscroscopically that the bacteria moved toward the cathode under DC stimulus. However, with 60 Hertz stimulus, the bacteria stay essentially in one place and "vibrate" until they are destroyed. At about 200 to 400 Hertz they stay in one place and slowly rotate or tumble; and this rotation appears to cause no lasting harm, altough after the electrical stimulus is removed, it takes about one or two seconds for the bacteria to regain normal movement abilities.

From the foregoing, it can be seen that alternating electrical current can be utilized to purify liquid either passing through the housing 10 or contained therein in a stationary condition. The killing phenomenon of bacteria is most efficient at a frequency of approximately 60 c.p.s. It is therefore seen that this invention achieves its principal objectives.

I claim:

1. The method of purifying a water-base liquid by selective killing of only undesirable bacteria, comprising, placing the liquid to be purified in a container, and passing approximately 60 c.p.s. alternating electrical current of 2–8 amperes at 7–28 volts through said liquid to destroy only undersirable living impurities therein by vibrating the muscles of the bacteria, said current being passed through said liquid for 1 to 8 minutes until the liquid reaches a desired purity level.

References Cited

UNITED STATES PATENTS

| | | | |
|---|---|---|---|
| 501,732 | 7/1893 | Roeske | 204—152 |
| 661,340 | 11/1900 | Grever | 204—149 |
| 951,314 | 3/1910 | Hartman | 204—149 |
| 1,057,367 | 3/1913 | Van Pelt | 204—149 |
| 1,183,753 | 5/1916 | Moody | 204—149 |
| 2,490,730 | 12/1949 | Dubilier | 204—305 |
| 2,530,524 | 11/1950 | Hlavin | 204—217 |
| 2,839,463 | 6/1958 | Vellas et al. | 204—212 |
| 1,479,725 | 1/1924 | Macy | 21—54 R X |
| 1,775,579 | 9/1930 | Woodrich | 99—221 X |
| 2,614,938 | 10/1952 | Meehan | 99—221 |
| 3,336,220 | 8/1967 | Neidl | 99—221 X |
| 3,594,115 | 7/1971 | Wesley et al. | 210—19 X |

JOHN H. MACK, Primary Examiner

A. C. PRESCOTT, Assistant Examiner

U.S. Cl. X.R.

21—54 R; 204—149; 210—19; 99—221